Patented Jan. 15, 1946

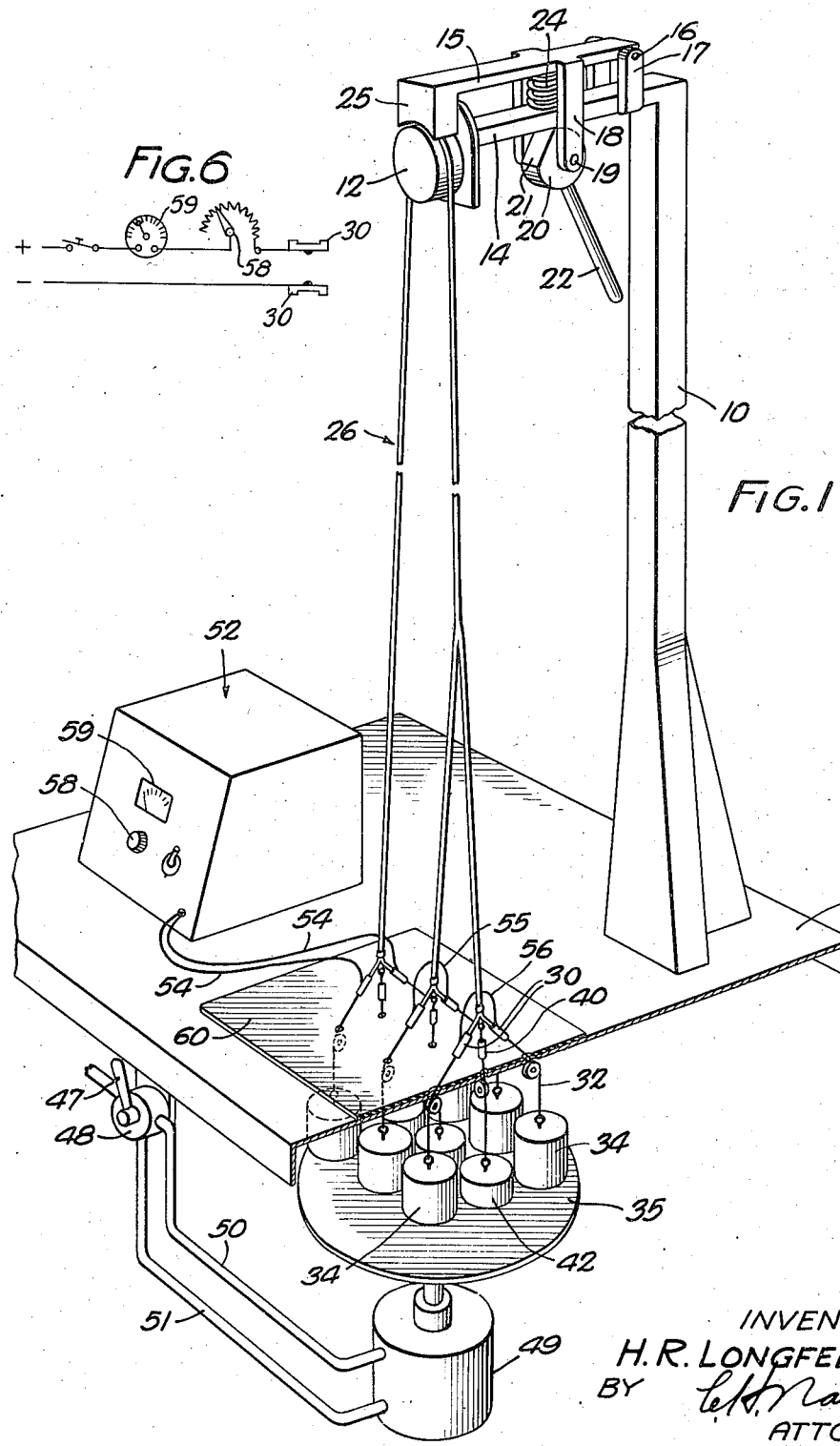

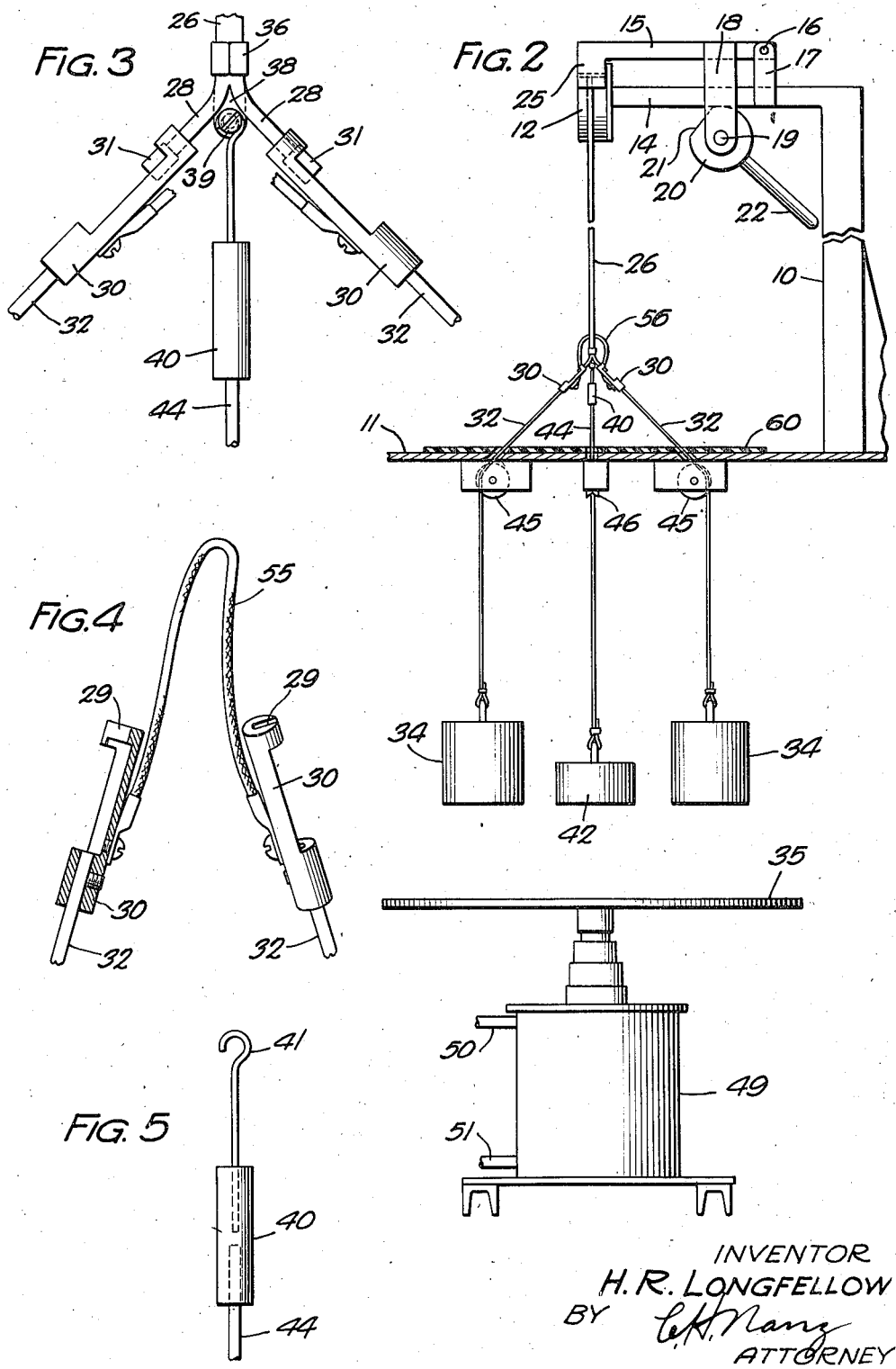

2,393,177

UNITED STATES PATENT OFFICE 2,393,177

APPARATUS FOR TESTING ELECTRICAL CONDUCTORS

Harold R. Longfellow, Baltimore, Md., assignor to Western Electric Company, Incorporated, New York, N. Y., a corporation of New York Application November 7, 1942, Serial No. 464,839

5 Claims. (Cl. 175—183)

This invention relates to apparatus for testing electrical conductors, and more particularly to apparatus for testing Y-type cords.

In the production of Y-type cords, such as those that are used with switch board operators' ear phones, certain requirements must be met if the cords are to function satisfactorily. It is necessary that these cords be flexible, yet strong enough to withstand considerable tension.

An object of this invention is to provide new and improved methods of and apparatus for testing electrical conductors, and more particularly, to provide new and improved methods of and apparatus for testing Y-type cords.

One type of apparatus embodying the invention comprises means for suspending a cord having a tip formed on an end thereof, a weight, means for suspending the weight from the tip on the cord, means for passing an electric current through the cord, and an indicator connected in circuit with the cord for detecting defects in the cord.

Other features and objects of the invention will become apparent from the following detailed description of one embodiment thereof, when read in conjunction with the accompanying drawings, in which Fig. 1 is a perspective view of a testing apparatus embodying the invention;

Fig. 2 is a vertical sectional view of the testing apparatus shown in Fig. 1;

Figs. 3, 4 and 5 are enlarged fragmentary views of the testing apparatus shown in Fig. 1, and Fig. 6 is a wiring diagram of the testing circuit.

In the particular embodiment of the invention disclosed in the accompanying drawings, a vertical column 10 is fastened to a work table 11. A cylindrical support 12 is fastened to the end of an arm 14 formed on the upper end of the column 10, while a second arm 15 is pivoted near one end on a pin 16 mounted in arms 17—17 which are fastened to the arm 14. A pair of arms 18—18 are fastened to the middle portion of the arm 15 and carry a pin 19 near the outer ends thereof. A rotary cam 20, having a flattened side 21, is rotatively mounted on the pin 19 and an arm 22 is secured thereon to rotate the cam 20 about the pin 19.

A spring 24 tends to force the arm 15 to pivot away from the arm 14 so that when the flattened portion 21 of the cam 20 is adjacent to the arm 14, there is sufficient room between a shoe 25 formed on the end of the arm 15 and the cylindrical support 12 to easily insert a portion of Y-type cord 26 therebetween. When the cam 20 is rotated about the pin 19 until the curved surface of the cam 20 contacts the arm 14, the arm 15 is forced toward the arm 14 until the Y-type cord 26 is frictionally engaged between the shoe 25 and the cylindrical support 12.

The Y-type cord 26 shown in the accompanying drawings contains 3 conductors, each of which has tips formed on both ends thereof. The conductors in the cord 26 are so arranged that two of the conductors pass through the stem portion of the cord to the crotch portion where they separate and continue along opposite arms of the Y. The third conductor passes up one arm of the Y to the crotch portion of the cord and down the other arm. Consequently, there are two tipped conductors emerging from each of the three ends of the Y-type cord 26.

In order to test the Y-type cord 26 for defects while it is being subjected to considerable tension, each conductor 28 (Fig. 3) is forced into a slot 29 formed in one end of a connector 30. The slot 29 is just wide enough to permit a conductor 28 to be forced therein, but not wide enough to permit a tip 31 attached to the conductor 28 to be retracted therethrough. On the other end of the connector 30 is fastened a cord 32 which is attached to a weight 34 normally supported upon a platform 35. The weight 34 will vary with the cord being tested, but in the particular embodiment disclosed in the accompanying drawings it is a 5 pound weight. A stay band 36 (Fig. 3) is fastened about each of the three ends of the cord 26 and is provided with an extension member 38 having a screw 39 mounted therein. A connecting member 40 (Fig. 5) having a hook-shaped portion 41 designed to engage the shank of the screw 39, is provided for each stay band 36. A weight 42 is attached to each connecting member 40 by means of a cord 44 and, in this particular instance, the weight weighs about 2½ pounds. The weights 34—34 and 42—42 are positioned beneath the table 11 and pulleys 45—45 and 46—46 are provided for the cords 32—32 and 44—44, respectively, to permit the weights to be raised and lowered smoothly and without interference with each other. The platform 35, which normally supports the weights 34—34 and 42—42, may be raised or lowered by turning in the proper direction a handle 47 which controls a valve 48 that regulates the supply of air to and from an air cylinder 49 through pipes 50 and 51. The air cylinder 49 contains a double acting piston, so that by turning the handle 47 in a given direction, air is forced in below or above the piston and raises or lowers the platform 35.

A current regulating and indicating instrument 52 is connected by lead wires 54—54 to the two conductors 28—28 which form the stem of the Y-type cord. The third conductor in the crotch of the cord 26 is connected in series with the other two conductors contained therein by means of connecting wires 55 and 56 which are fastened to the connectors 30—30, as shown in Fig. 4. The lead wires 54—54 are connected to the connectors 30—30 by a similar arrangement. A rotatable knob 58 forming part of the instrument 52, may be operated to control the amount of resistance in the line and a meter 59 indicates the amount of current passing through the instrument 52 and the conductors. A mat 60 of insulating material, such as rubber, is placed on the work table 11 beneath the cord 26 to prevent shorting the conductors in the cord by contact with the table top.

In the operation of the apparatus, the central portion of the Y-type cord 26 is placed over the cylindrical support 12 and then the tips 31—31 are fastened on the conductors 28—28 to the connectors 30—30. The connecting members 40—40 are hooked over the shanks of the screws 39—39 in the bands 36—36 and the arm 22 is pushed toward the back of the apparatus until it is in the position shown in Fig. 1, thus clamping the cord 26 between the shoe 25 and the cylindrical support 12. Electric current is then passed through the conductors 28—28 and the knob 58 is turned to provide sufficient resistance to obtain the desired reading on the meter 59. The platform 35 upon which the weights 34—34 and 42—42 are supported is then gradually lowered to the position shown in Fig. 2 by turning the handle 48 so as to permit compressed air to pass through the pipe 50 and to enter the air cylinder 49 above the double acting piston therein contained. The weights 34—34 are suspended from the tips of the conductors 28—28 and the weights 42—42 are suspended from the stay bands 36—36, these weights being thus suspended for a period of about one minute. If during this time the needle of the meter 59 remains constantly at its original setting the cord is satisfactory, but should the needle waver back and forth across the meter, the cord is defective. After the weights have been suspended for a period of about one minute, the handle 48 is turned so as to permit compressed air to flow through the pipe 51 and into the air cylinder 49, below the double acting piston positioned therein, thus returning the platform 35 to a predetermined level at which all the weights are supported thereon.

The time required for testing a Y-type cord with the above described device is less than two minutes, and one operator may operate several machines at once. Thus, it is apparent that the testing apparatus hereinabove described is economical in that it represents a time-saving device as well as a simple and effective method of testing several conductors at the same time.

Several modifications of the testing apparatus disclosed in the accompanying drawings may be made without departing from the scope of the invention. Several such units as disclosed in Fig. 1 may be operated side by side on a long work table. The apparatus employed to raise and lower the platform 35 may be varied to suit the particular case. Other types of connectors 30—30 may be employed along with other arrangements of suspending the weights 34—34 and 42—42. The particular type of clamp used to hold the cord 26 while it is being tested may, of course, be varied to suit the individual requirements of different types of cords.

What is claimed is:

1. In a testing apparatus, means for suspending a conductive cord having tips on some of the ends thereof with each tip thereon directed downwardly, a plurality of weights, means for supporting the weights, means for connecting a weight to each tip on the cord, means for lowering the support for the weights until the weights are suspended from the tips on the cord, means for passing an electric current through the cord while the weights are suspended therefrom, and means in circuit with the cord for indicating the magnitude of current flow therein.

2. In a testing apparatus, a member for suspending a multiple conductor cord having a tip attached to each end of each conductor, a plurality of weights, a support for positioning the weights, means for connecting a weight to each tip, means for gradually lowering the support for the weights until each weight is suspended from a tip, means for connecting the conductors in the cord in series, means for passing an electric current through the conductors while the weights are suspended from the tips, and means in circuit with the conductors for indicating the magnitude of current flow therein.

3. In an apparatus for testing Y-type, multiple conductor cords having a tip attached to each end of each conductor and having stay bands adjacent to the tips, a member over which such a cord may be hung, a clamp for clamping the cord upon the member, a plurality of weights, a support for positioning the weights, means for connecting a weight to each tip, means for connecting a weight to each stay band, means for gradually lowering the support for the weights until the weights are suspended from the tips and stay bands, electrical connectors for connecting the conductors in the cord in series, means for passing an electric current of predetermined value through the conductors while the weights are thus suspended, means for registering any fluctuation in current while the weights are thus suspended, and means for raising the support for the weights to take the tension from the tips and stay bands.

4. In an apparatus for testing Y-type, multiple conductor cords having tips positioned on all of the ends of the conductors thereof and also being provided with stay bands on some of the ends of the conductors adjacent to the tips thereof, a member over which such a cord may be hung, means for clamping to the member a cord hung over the member, a plurality of weights, means for attaching a weight to each stay band, means for attaching a weight to each tip on the conductors, means for passing a current through the conductors, and means in circuit with the conductors for indicating the magnitude of current flow therein.

5. In an apparatus for testing multiple conductor cords having tips secured to all of the ends of the conductors thereof and also provided with stay bands on all of the ends of the conductors adjacent to the tips thereof, a support over which such a cord may be hung, means for securing a cord hung over said support, a plurality of weights of different magnitudes, means for attaching weights of one magnitude to the tips on the cord, means for connecting weights of another magnitude to the stay bands, means for passing a current through the conductors, and means for indicating a fluctuation in the current passed through the conductors.

HAROLD R. LONGFELLOW.